Patented Sept. 26, 1922.

1,430,167

UNITED STATES PATENT OFFICE.

MARSHALL E. HUNT, OF BELLE PLAINE, IOWA.

METHOD OF TREATING AND RESTORING USED STORAGE BATTERIES.

No Drawing. Application filed November 4, 1921. Serial No. 512,926.

*To all whom it may concern:*

Be it known that I, MARSHALL E. HUNT, a citizen of the United States, residing at Belle Plaine, in the county of Benton and State of Iowa, have invented certain new and useful Improvements in Methods of Treating and Restoring Used Storage Batteries, of which the following is a specification.

This invention relates to an improved method of treating and restoring used storage batteries and consists in subjecting the positive plates of any make of storage battery to a strong and steady heat from gas or other sources in order to dry the plates thoroughly to the point where if continued, the heat would melt the active material of the plates, and in also subjecting the negative plates of the battery to heat of a less degree but sufficient to dry the same.

The old and common method or rebuilding and restoring used batteries is to keep them in water or in a wet condition until they are re-built. My improved method of treatment is just the opposite, as it consists in drying them out thoroughly. As is well known, after the battery has been used until the plates become dead, the plates are of a blackish color and covered with a coating of a greasy nature, but by employing my improved method of treatment, this coating is not only thoroughly dried out, but the original reddish color of the plates is practically restored. Further, as a result of my method of treatment, the operator is enabled to run the battery on a smaller quantity of distilled water, as compared with the amount used in the average new battery. The life of the battery is also lengthened from two to three years.

It is further claimed that the cells of used batteries when treated by my improved method, when put on a charging machine, almost always register the same strength, whereas in batteries rebuilt in the old way, the cells do not come up even and generally one or more have to be separately charged in order to bring them all to the same strength. It is also claimed that batteries recharged and rebuilt by methods now commonly in use, do not last within a year and one-half to two years of those treated and restored by my method.

Having described my invention, what I claim as new and desire to secure by Letters Patent, is:—

1. The herein described method of treating and restoring used storage batteries, consisting in subjecting the positive and negative plates to heat sufficient to dry the same.

2. The herein described method of treating and restoring used storage batteries consisting in subjecting the positive and negative plates to heat of different degrees.

3. The herein described method of treating and restoring used storage batteries, consisting in subjecting the positive plates to heat sufficient to thoroughly dry the same and the negative plates to heat of less degree but sufficient to dry.

In testimony whereof I affix my signature.

MARSHALL E. HUNT.